United States Patent [19]

Frye et al.

[11] 3,928,178

[45] Dec. 23, 1975

[54] METHOD OF CONTROLLING CATALYST DEPOSITS IN HYDRODESULFURIZATION

[75] Inventors: Clifton G. Frye, Valparaiso; Warren L. McBride, Griffith, both of Ind.

[73] Assignee: Standard Oil Company, Chicago, Ill.

[22] Filed: June 12, 1974

[21] Appl. No.: 478,629

[52] U.S. Cl. .................................. 208/210; 208/214
[51] Int. Cl.² ......................................... C10G 23/00
[58] Field of Search ........... 208/210, 211, 209, 216

[56] References Cited
UNITED STATES PATENTS

| | | | |
|---|---|---|---|
| 2,878,179 | 3/1959 | Hennig | 208/210 |
| 3,011,971 | 12/1961 | Slyngstad et al. | 208/210 |
| 3,091,586 | 5/1963 | Pappas et al. | 208/210 |
| 3,147,210 | 9/1964 | Hass et al. | 208/210 |
| 3,159,568 | 12/1964 | Price et al. | 208/216 |
| 3,425,810 | 2/1969 | Scott, Jr. | 208/210 |
| 3,728,249 | 4/1973 | Antezana et al. | 208/210 |
| 3,753,894 | 8/1973 | Shoemaker et al. | 208/216 |

*Primary Examiner*—Delbert E. Gantz
*Assistant Examiner*—G. J. Crasanakis
*Attorney, Agent, or Firm*—Philip Hill; Arthur G. Gilkes; William T. McClain

[57] ABSTRACT

A multiple-bed, hydrodesulfurization process whereby a plurality of fluid streams are introduced to optimally control the process temperatures thereby regulating the location and level of metallic and carbonaceous materials deposited on the catalyst.

6 Claims, 1 Drawing Figure

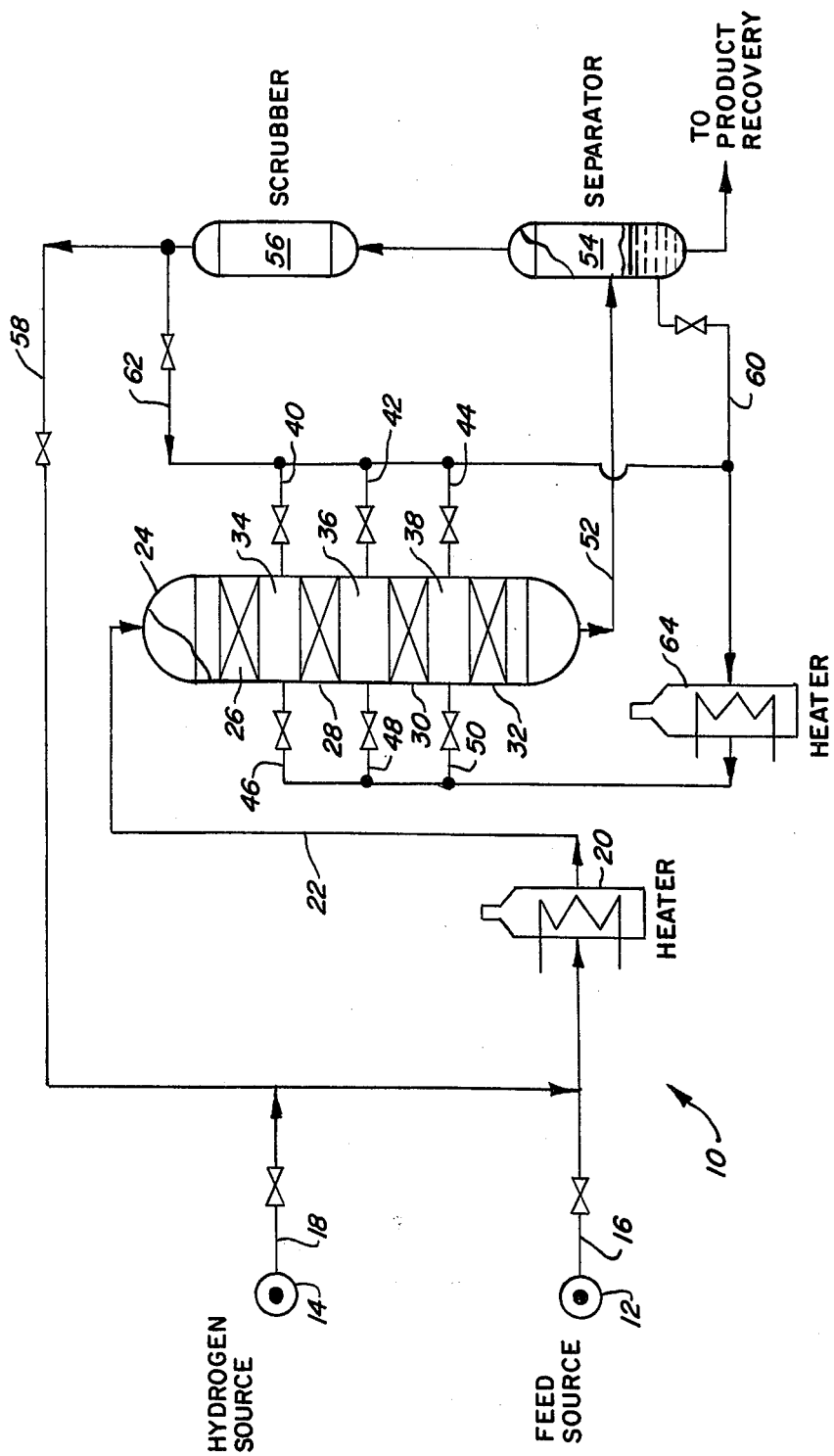

METHOD OF CONTROLLING CATALYST DEPOSITS IN HYDRODESULFURIZATION

BACKGROUND

Many State and Federal Agencies have enacted laws placing severe limitations on the allowable sulfur content of heavy fuel oils. The express purpose of these limitations is to reduce the sulfur compounds exhausted with the combustion products. While these limitations are commendable they place a considerable burden on petroleum refiners. Most of the crude oils available today contain sulfur in amounts considerably in excess of permissible levels and, therefore, large fractions of sulfur must be removed from petroleum products during the refining process.

Heavy fuel oils such as atmospheric resid, vacuum gas-oil and vacuum resid, having boiling temperatures greater than 650°F, may be desulfurized by contacting the oil feed with a desulfurizing catalyst in the presence of hydrogen at elevated pressure and at a temperature in the order of 625° to 800°F. The oil feed is generally preheated in the range of about 625° to about 800°F prior to contacting the catalyst. Desulfurization is most often accomplished in a multiple bed reactor which may contain from two to six catalyst support trays spaced axially therein. Each tray in the reactor supports a catalyst bed which may vary from five to fifteen feet thick. The catalyst support trays are perforated with a plurality of holes which prevent the passage of catalyst but permit the oil feed to readily pass from one bed to the next. The oil feed is introduced into the top of the reactor and is progressively desulfurized as it trickles through the catalyst in each successive bed before being withdrawn from the bottom.

The operating conditions of the desulfurization process are characterized by such factors as the feed composition, the level of sulfur to be removed, the amount of hydrogen consumed and the amount and condition of the catalyst used. In order to maximize the throughput capacity the highest effective operating temperature is generally selected that is consistent with all other factors. The desulfurization reaction, however, is moderately exothermic, therefore, all other conditions being held constant, the exit temperature of the feed from the reactor will be significantly higher than the inlet temperature with the total temperature increase across the reactor being generally related to the amount of hydrogen consumed, which in turn is related to the amount of sulfur removed. At high operating temperatures the exothermic reactions can pose severe processing limitations since the greatly increased reactor temperatures will cause an excessive amount of undesirable cracking of the feed and deactivation of the catalyst. In order to maintain reasonable control of the reaction and to suppress the rate of catalyst deactivation, it has been found necessary to limit the buildup of reaction temperatures. This is accomplished by injection of a cold recycle liquid or gas to be mixed with the feed as it passes from one bed to the next. This feed quench technique is only partially effective, however, since the rate of temperature rise, and correspondingly the rate of desulfurization, is non-linear being greatest in the top portion of the reactor and rapidly decreasing in the later stages.

Another facet of the desulfurization process relates to the progressive buildup of deposits on the catalyst. Essentially all heavy fuel oils contain various amounts of metals, particularly vanadium and nickel. During the desulfurization process substantial amounts of these metals are extracted from the process stream and deposited on the catalyst. Since the rate of metallic deposition is related to the rate of desulfurization, the fastest accumulation of deposits also occurs in the top portion of the reactor. It has been observed that vanadium has a greater tendency to deposit in the pores of the catalyst near the surface while nickel has a tendency to deposit more evenly across the catalyst particle. The effect of metal deposits is to decrease catalyst activity and therefore desulfurization. The accumulation of metallic deposits fills not only the pores of the catalyst, but also eventually deposit on the surface and thus gradually decrease the porosity of the catalyst bed, thereby limiting feed throughput.

In addition to metal deposition, the desulfurization reaction also causes carbon lay-down on the catalyst which contributes to bed plugging. While carbon deposition is generally not severe, the presence of hydrogen sulfide from the desulfurization reaction increases the deposition rate. Excessive temperature buildup, which causes cracking of the feed, will also increase coke deposition. Since the rate of deposition of the combined deposits is related to the reduction in feed sulfur content, which occurrence is greatest in the top portion of the reactor, the accumulation of deposits at any given time is correspondingly greatest in the top portion of the reactor and least in the bottom portion. As this condition progresses with time on stream, the catalyst in the top portion of the reactor becomes increasingly plugged causing a progressive pressure drop buildup. If permitted to proceed, the catalyst in the top portion of the reactor will ultimately become completely plugged, causing termination of the process run even through the catalyst in the balance of the reactor is still active.

DESCRIPTION OF THE INVENTION

The present invention relates to an improved hydrodesulfurization process permitting an extended process run under a condition of progressive catalyst bed plugging caused by the uptake of metallic and carbonaceous deposits. More specifically, the present invention provides for the introduction of a plurality of fluid streams into a multiple bed desulfurization reactor to optimally control the process stream temperatures while at the same time regulating the location and level of catalyst deposits which in the past have limited the process operation.

The central feature of our system is to provide temperature control means of the process stream as it enters each reactor catalyst bed such that the process stream best responds to the existing condition of the catalyst in each successive bed. As a freshly charged desulfurization reactor is placed on stream, the feed is progressively desulfurized as it passes through each successive catalyst bed. The temperature buildup in the feed due to the exothermic desulfurization reaction is controlled by the injection of a quench fluid which admixes with the feed subsequent to its exit from each catalyst bed and prior to its entry into the next successive downstream catalyst bed. The feed is generally quenched in an amount sufficient to approximately offset the heat gain across each catalyst bed. Since the feed is progressively desulfurized as it passes through each successive bed, the heat to be extracted is generally reduced for each successive downstream bed.

This generally standardized processing technique has proved to be adequate only for so long as accumulated catalyst deposits do not restrict free passage of the process stream. As accumulated deposits build up, the desulfurization activity is reduced and the pressure drop through the catalyst bed increases. We have discovered that incipient and progressive pressure-drop buildup across a catalyst bed, caused by the accumulated uptake of metallic and carbonaceous deposits by the catalyst, is suppressed or eliminated by reducing the temperature of the incoming feed from about 5° to about 40°F, depending upon the condition of the catalyst. Sensing the pressure drop buildup is readily detectable by the use of commercially available equipment made for such purposes. To stop incipient plugging of the first catalyst bed in a reactor, a reduction in feed temperature is most easily accomplished by reducing the reactor feed inlet temperature. For the second and each successive downstream catalyst bed, the interbed process stream quenching means may be used as needed to limit the progressive temperature buildup caused by the desulfurization reaction.

On the other hand, the effected reduction of incoming feed temperature into the first catalyst bed to limit or prevent further accumulation of deposits on the catalyst creates the undesirable effect of reducing or eliminating the desulfurization in that bed. In order that the desired level of feed desulfurization be accomplished in a single pass through the reactor, it becomes necessary to increase the rate of desulfurization in the remaining downstream active beds to compensate for the reduced desulfurization in the first passivated bed. This may be accomplished by a controlled increase in the incoming temperature of the feed subsequent to its exit from the first passivated bed and prior to its entry into at least the next downstream catalyst bed. Accordingly, this invention provides for the injection of a heating fluid to be admixed with the process stream as it passes from the first passivated catalyst bed to the next adjacent active bed. The process stream temperature increase required is greater than the temperature reduction needed to passivate the preceding upstream bed and generally is in the order of about 10° to about 50°F. The temperature increase may be accomplished by the injection of heated recycle product or other heavy hydrocarbon material. Desulfurization of the process stream thereafter proceeds at a controlled low level in the first catalyst bed and at an artificially increased level in the second and each successive downstream bed to the last. The process stream is preferably quenched as it passes between each subsequent pair of adjacent downstream beds so as to control the process stream temperature gain in any given bed.

Upon further sustained operation, the progressive accumulation of metallic and carbonaceous deposits will cause incipient plugging in the second catalyst bed and subsequent rapid pressure-drop buildup. When this condition is sensed by pressure detection means the hereinabove described system of effecting a controlled reduction in the temperature of the process stream entering the partially plugged bed sufficient to suppress or eliminate further accumulation of deposits on the catalyst contained therein and a subsequent controlled increase in the process stream temperature subsequent to its exit from the effectively passivated catalyst bed but prior to its entry into the next successive downstream catalyst bed. The controlled reduction and increase of the process stream temperature is accomplished by the injection of a cold and heated fluid, respectively, into admix communication with the process stream. Desulfurization of the process stream thereafter proceeds at a regulated level in the first and second catalyst beds and at an artificially increased level in the third and each successive downstream catalyst bed to the last. This temperature controlled system of desulfurization is repeated for as many times as there are additional downstream catalyst beds preceding and upstream of the last reactor catalyst bed. Ideally, process stream temperature can be controlled as described in this disclosure prior to the entry of such stream into the first catalyst bed and each successive downstream catalyst bed to the last, so that the total accumulation of catalyst deposits in the first bed and each successive downstream catalyst bed to the last is essentially uniform.

Our system permits continuous controlled operation of a multiple bed resid hydrodesulfurization process until the catalyst contained in all the catalyst beds are essentially equally deactivated by accumulated metallic and carbonaceous deposits. Thus, our system provides a more economical desulfurization process than heretofore attainable. Moreover, as a result of the controllable high level and essentially uniform amounts of metals deposited on the catalyst, the spent catalyst provide a more efficient and economical source for the recovery of vanadium and nickel.

DESCRIPTION OF SPECIFIC EMBODIMENT

The FIGURE depicts schematically a closed, four-stage, hydrodesulfurization system 10 which embodies the basic principles of our invention. A desulfurization system as described has a feed capacity in the order of about 40,000 bpd with the reactor containing in the order of 400,000 pounds of catalyst. Typically the catalyst is cobalt-molybdenum metal on an alumina support. For a feed of Khafji atmospheric resid, having an initial sulfur content of about 4.3%, the hydrogen consumption rate is in the order of 600 standard cubic feet per barrel of feed to attain a desulfurization level of about 77 percent.

System 10 is charged from feed source 12 and hydrogen source 14 and fed via valved lines 16 and 18, respectively, to heater 20 where the process stream is heated to about 700°F. The heated process stream passes through line 22 and into reactor 24 where it flows into first catalyst bed 26 at about 700°F. The exothermic desulfurization reaction in first bed 26 raises the temperature of the process stream to about 730°F. After passing through catalyst bed 26, temperature detection means (not shown) sense the process stream temperature and cause a quench fluid to be injected via valved line 40 in admix communication with process stream thereby cooling the process stream to about 700°F prior to its introduction into second catalyst bed 28. In order to facilitate fluid mixing and heat transfer between the process stream and the injected fluid, the interbed transfer sections 34, 36 and 38 may be fitted with apparatus for mixing fluids of the type described in U.S. Pat. No. 3,787,189.

As the process stream passes sequentially through beds 28 and 30, the exit temperatures are about 725°F. and 720°F., respectively, and correspondingly quenched to about 700°F. in successive reactor transfer sections 36 and 38 by means of injected quench fluids via valved lines 42 and 44. After passing through final catalyst bed 32, the process stream exits reactor 24 at a temperature of about 710°F. and piped via line 52 to separator 54. The desulfurized feed is piped to product recovery while the recovered hydrogen is passed through scrubber 56 and piped through line 58 for recycle. The preferred quench fluid injected via lines 40, 42 and 44 is recycle gas from separator 56 at a temperature of about 150°F.

After a period of sustained operation, metallic and carbonaceous deposits accumulate on the catalyst sufficient to cause incipient bed plugging and subsequent pressure-drop buildup in first catalyst bed 26. Pressure detection means (not shown) sense the pressure drop and in response to a prescribed process schedule, will cause a reduction in the incoming temperature of the process stream of about 10°F. Process stream thereafter exits bed 26 at a controlled temperature of about 700°F. and is subsequently heated as it passes through reactor transfer section 34 by the injection of a heated fluid to enter bed 28 at about 710°F. The preferred heated fluid is recycle product from separator 54, piped via line 60 through heater 64 for injection via valved line 46 at a temperature of about 800°F. Process stream then passes sequentially through beds 28 and 30 having exit temperatures of about 725°F. and 720°F., respectively, and correspondingly quenched to about 700°F. in successive reactor transfer sections 36 and 38 by the injection of quench fluids via valved lines 42 and 44. After passing through bed 32, process stream exits reactor 24 at about 720°F. for transfer to separator 54.

After further sustained operation accumulation of catalyst deposits will cause incipient plugging and subsequent pressure drop buildup in second catalyst bed 28. Pressure detection means sense the pressure drop thereby indicating the need for a controlled reduction of the reaction temperature in said bed 28 in order to prevent total bed plugging. Thereafter, the injection of heated fluid in reactor transfer section 34 is discontinued such that the temperature of incoming feed to catalyst bed 28 is limited to about 690°F. In order to facilitate the controlled limitation of incoming feed temperature of second bed 28 and to further limit the accumulation of further deposits on the catalyst in first bed 26, a further reduction in the temperature of the incoming reactor feed to about 685°F may be desirable. The process feed exits first catalyst bed 26 at a temperature of about 690°F. suitable for direct entry into second bed 28. So as to compensate for the reduced desulfurization activity in now passivatd beds 26 and 28, the process stream temperature is raised to about 720°F subsequent to its exit from catalyst bed 28 and prior to its entry into third catalyst bed 30 by means of an injection of a heated fluid into admix communication with the process stream in interbed transfer section 36. The heated fluid is preferably recycle feed injected through valved line 48 at about 800°F. The heated process stream exits catalyst bed 30 at about 770°F and is quenched to about 720°F prior to its entry into final catalyst bed 32 by means of injecting a quench fluid into admix communication with process stream in interbed transfer section 38. As before, the preferred quench fluid is recycle gas fed through valved line 44 at a temperature of about 150°F. The process stream exits final catalyst bed 32 at about 740°F and piped via line 52 to separator 54.

The final condition of instability occurs when, after further sustained operation, the accumulation of catalyst deposits cause incipient plugging and subsequent pressure-drop buildup in third catalyst bed 30. Pressure detection means sense the pressure drop and signal the need for a controlled reduction in the temperature of the incoming feed to said catalyst bed 30. As in the case of incipient plugging of second bed 28, it is advisable to effect a further reduction in the temperature of the incoming feed to the desulfurization reactor. Accordingly, the incoming feed temperature to first catalyst bed 26 is reduced to about 680°F. The reduced exothermic reactions raise the exit temperature to about 685°F, at which temperature the feed stream enters second catalyst bed 28 to exit at about 690°F. Without further temperature modification, the process stream enters third catalyst bed 30 at about 690°F and exits at about 700°F. To compensate for the controlled reduction in desulfurization activity of catalyst beds 26, 28 and 30, the process stream temperature is raised to about 735°F subsequent to its exit from third passivated bed 30 and prior to its entry into the final catalyst bed 32 by the injection of a heated fluid into admix communication with the process stream in interbed transfer section 38. Again, the preferred heating fluid is recycle feed fed via valved line 50 at a temperature of about 800°F. The process stream then exits bed 32 at about 800°F to be fed via line 52 to separator 54. Processing of the feed stream continues thereafter until catalyst bed 34 becomes plugged causing termination of the process run. The spent catalyst is then removed for regeneration and/or replacement.

It should be understood that the above-described embodiments are merely illustrative of the principles of the present invention. Various modifications may be made in the overall design and process in the manner of effecting intermediate introduction of heating and quenching fluids as well as variations in the temperature control limits. Further, the process described is adaptive to the use of any type of geometry of desulfurizing catalyst and, therefore, the invention should not be construed to limit the protection available. It is further contemplated that those skilled in the art could adapt the process described herein to a single stage desulfurization reactor. Heretofore single stage reactors have experienced considerable difficulty in maintaining an operative desulfurization process. The rapid buildup of deposits in the top portion of the reactor catalyst bed causes premature termination of the process run. Attempts to avoid the problems associated with process stream temperature gains by reducing the temperature of the incoming feed have proved to be unsatisfactory in that the level of sulfur reduction is correspondingly reduced. Intrabed quenching techniques have only been moderately effective due to inadequate heat transfer. The incorporation into a single stage desulfurization reactor of the feed temperature control means as described in this invention would immeasurably improve the process. However, the mechanical difficulties associated with intrabed piping make the principles of this invention more amenable to a multiple-bed desulfurization process.

What is claimed is:

1. In a hydrodesulfurization process combining the steps of preheating in the range of about 625° to about 800°F a process stream comprising liquid hydrocarbons boiling above 650°F and hydrogen gas, passing said process stream into a reactor containing a plurality of fixed catalyst beds spaced axially therein, said reactor having connected thereto a plurality of quench fluid inlet means between each two adjacent catalyst beds, reacting said process stream in the presence of desulfurization catalyst contained in a first catalyst bed and successive downstream catalyst beds including a last catalyst bed, extracting heat from said process stream by injecting through said quench fluid inlet means, a cool quench fluid into admix communication with said process stream subsequent to its exit from each catalyst bed but prior to its entry into the next successive downstream catalyst bed, wherein the process stream is progressively desulfurized as it passes through each successive catalyst bed, said desulfurization being accompanied by the deposition of metallic and carbonaceous materials on said catalyst, the accumulation of said deposits being greatest in said first catalyst bed and least in said last catalyst bed whereby progressive catalyst bed plugging and pressure-drop buildup occur, causing premature termination of the process run, the improvement comprising:

a. providing means for detecting incipient bed plugging and subsequent pressure-drop buildup in said first catalyst bed and each successive downstream catalyst bed preceding and upstream of said last catalyst bed;

b. providing a plurality of heating fluid inlet means, connecting with said reactor between each two adjacent catalyst beds;

c. sensing incipient plugging by said detecting means in said first catalyst bed caused by said accumulated deposits on the catalyst therein;

d. reducing the temperature of the process stream entering said first catalyst bed by an amount sufficient to reduce or eliminate the desulfurization activity thereby reducing or eliminating the further accumulation of metallic and carbonaceous deposits on the catalyst bed therein;

e. increasing the temperature of the hydrodesulfurization reaction stream subsequent to its exit from said first catalyst bed but prior to its entry into the next successive downstream catalyst bed, by an amount greater than the temperature reduction effected in step (d), by injecting through said heating fluid inlet means, a heated recycle oil to admix with said hydrodesulfurization reaction stream, thereby increasing the desulfurization rate in said next successive downstream catalyst bed, and each additional downstream catalyst bed thereafter to the last to compensate for the reduced desulfurization rate in said first catalyst bed; and f. repeating steps (c), (d) and (e) for each successive catalyst bed downstream of said first catalyst bed and upstream of said last catalyst bed, whereby the level of catalyst deposits in each catalyst bed upstream of the last catalyst bed are controlled permitting an extended process run.

2. The improved process of claim 1 wherein the temperature reduction of the process stream in step (d) is from about 5° to about 40°F.

3. The improved process of claim 1 wherein the temperature increase of the process stream in step (e) is from about 10° to about 50°F.

4. The improved process of claim 1 wherein the temperature reduction of the process stream entering each catalyst bed downstream of said first catalyst bed to the last is effected by injecting through said quench fluid inlet means a quench fluid into admix communication with said hydrodesulfurization reaction stream.

5. The improved process of claim 1 wherein said detecting means is a differential pressure measuring instrument.

6. The process of claim 1 wherein said process stream includes about 500 to about 10,000 standard cubic feet of hydrogen per barrel of liquid hydrocarbons.

* * * * *